(12) United States Patent
Sullivan

(10) Patent No.: US 10,778,664 B1
(45) Date of Patent: Sep. 15, 2020

(54) SOFTWARE ASSET MANAGEMENT OF COMPUTER SYSTEMS AND VIRTUAL INSTANCES FOR REPORTING AND OPTIMIZATION

(71) Applicant: Amazon Technologies, Inc., Seattle, WA (US)

(72) Inventor: Owen Seamus Sullivan, Newbridge (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/712,877

(22) Filed: May 14, 2015

(51) Int. Cl.
  *G06F 7/04* (2006.01)
  *H04L 29/06* (2006.01)
  *G06F 16/248* (2019.01)
  *G06F 15/16* (2006.01)

(52) U.S. Cl.
  CPC ............ *H04L 63/08* (2013.01); *G06F 16/248* (2019.01)

(58) Field of Classification Search
  CPC ........ G06F 3/06; G06F 3/0604; G06F 3/0665; G06F 3/0685; G06F 21/577
  USPC ....... 711/E12.01, 156; 718/1; 726/22, 24, 25
  See application file for complete search history.

(56) References Cited

U.S. PATENT DOCUMENTS

| | | | | |
|---|---|---|---|---|
| 8,401,925 B1* | 3/2013 | Klein | ...................... | G06Q 30/06 705/26.62 |
| 8,412,810 B1* | 4/2013 | Tompkins | ........... | G06F 9/45558 709/201 |
| 8,615,589 B1* | 12/2013 | Adogla | ................. | G06F 9/5077 709/226 |
| 8,738,972 B1* | 5/2014 | Bakman | .............. | G06F 11/0712 714/47.1 |
| 8,813,233 B1* | 8/2014 | Wilson | .................. | G06F 21/577 718/1 |
| 8,918,785 B1* | 12/2014 | Brandwine | ......... | G06F 9/45558 718/1 |
| 2007/0143753 A1* | 6/2007 | Vasile | ................. | G06F 11/3409 718/1 |
| 2008/0005787 A1* | 1/2008 | Aldred | ................. | G06F 21/105 726/4 |
| 2008/0134177 A1* | 6/2008 | Fitzgerald | ............. | G06F 21/577 718/1 |
| 2008/0243699 A1* | 10/2008 | Hilerio | .................. | G06F 21/105 705/59 |
| 2008/0306786 A1* | 12/2008 | Lonowski | .............. | G06Q 30/06 705/7.11 |
| 2009/0119779 A1* | 5/2009 | Dean | ..................... | G06F 21/128 726/26 |

(Continued)

*Primary Examiner* — Gary S Gracia
(74) *Attorney, Agent, or Firm* — Davis Wright Tremaine LLP

(57) ABSTRACT

A software asset management service obtains software asset information from various computer systems of a service provided by a service provider and available to customers of the service provider. Based on the obtained software asset information from the computer systems, the service updates a database to specify this information. The service then receives a request to generate a report of software assets for computing resources associated with a customer of a service provider. This may cause the service to access the database to obtain the software asset information for the specified computing resources. Once the service has obtained the necessary information from the database, the service generates the requested report.

20 Claims, 12 Drawing Sheets

(56) References Cited

U.S. PATENT DOCUMENTS

| | | | | |
|---|---|---|---|---|
| 2009/0198766 | A1* | 8/2009 | Chen | G06F 9/45558 709/202 |
| 2009/0217296 | A1* | 8/2009 | Gebhart | G06F 9/45558 719/317 |
| 2009/0327211 | A1* | 12/2009 | McCune | G06F 9/5077 |
| 2011/0119191 | A1* | 5/2011 | Stern | G06F 21/105 705/59 |
| 2011/0131315 | A1* | 6/2011 | Ferris | G06F 21/105 709/224 |
| 2012/0131578 | A1 | 5/2012 | Ciano et al. | |
| 2012/0167078 | A1* | 6/2012 | Arscott | G06F 11/3409 718/1 |
| 2012/0266177 | A1* | 10/2012 | Kakeda | G06F 3/0632 718/104 |
| 2013/0104125 | A1* | 4/2013 | Sarma | G06F 9/45558 718/1 |
| 2013/0179648 | A1* | 7/2013 | Yagame | G06F 3/0604 711/156 |
| 2013/0191923 | A1* | 7/2013 | Abuelsaad | G06F 21/10 726/26 |
| 2013/0262265 | A1* | 10/2013 | Song | G06F 21/105 705/26.41 |
| 2014/0040656 | A1* | 2/2014 | Ho | G06F 11/3093 714/3 |
| 2014/0108404 | A1 | 4/2014 | Chen et al. | |
| 2014/0122348 | A1 | 5/2014 | Fuller et al. | |
| 2014/0137259 | A1* | 5/2014 | Chen | G06F 21/105 726/26 |
| 2014/0258238 | A1* | 9/2014 | Jin | G06F 9/45558 707/649 |
| 2014/0289245 | A1* | 9/2014 | Deshpande | H04L 41/14 707/737 |
| 2014/0366150 | A1* | 12/2014 | Fang | H04L 63/101 726/26 |
| 2015/0007086 | A1* | 1/2015 | Weitzman | G06F 3/0484 715/772 |
| 2015/0007176 | A1* | 1/2015 | Kotani | G06F 9/45533 718/1 |
| 2015/0212840 | A1 | 7/2015 | Biran et al. | |

* cited by examiner

Computing Resource Service Provider Interface

Asset Management Service – Del Pueblo Estate

Applications Utilized 618

| Application | Manufacturer | Category | Lic. Purchased | Lic. In Use |
|---|---|---|---|---|
| Bopper Management Apps | Bopper Corp. | Other | 10 | 9 |
| Buchanan Shades OS 27 | Buckshade, LLC | Operating System | 8 | 5 |
| Cubane Diver XIII | Cubane, Inc. | Productivity | 15 | 6 |
| Cubane Reader X | Cubane, Inc. | Productivity | 15 | 6 |
| Hardmacro Workspaces '15 | Hardmacro Corp. | Productivity | 10 | 7 |
| Keydom Operating System V | Keydom, Inc. | Operating System | 8 | 1 |
| Megapeth VII Premium | Megapeth, Inc. | Operating System | 8 | 0 |
| Paladinium Driver Package | Paladinium, LLC | Other | 1 | 1 |

604  606  608  610  612

OK 614   Optimization Analysis 616   Cancel 600    602

FIG. 6

Computing Resource Service Provider Interface  [ Cancel ]

Asset Management Service – Del Pueblo Estate  _702_

Optimization Analysis  _718_

| Application | Manufacturer | Category | Lic. Purchased | Lic. In Use |
|---|---|---|---|---|
| Bopper Management Apps | Bopper Corp. | Other | 10 | 9 |
| Buchanan Shades OS 27 | Buckshade, LLC | Operating System | 8 | 5 |
| Cubane Diver XIII | Cubane, Inc. | Productivity | 15 | 6 |
| Cubane Reader X | Cubane, Inc. | Productivity | 15 | 6 |
| ~~Hardmacro Workspaces '15~~ | ~~Hardmacro Corp.~~ | ~~Productivity~~ | ~~10~~ | ~~7~~ |
| ~~Keydem Operating System V~~ | ~~Keydem, Inc.~~ | ~~Operating System~~ | ~~8~~ | ~~1~~ |
| ~~Megapeth VII Premium~~ | ~~Megapeth, Inc.~~ | ~~Operating System~~ | ~~9~~ | ~~0~~ |
| Paladinium Driver Package | Paladinium, LLC | Other | 1 | 1 |
| Cubane Cubicle '15 | Cubane, Inc. | Productivity | 10 | 7 |

_704_   _706_   _708_   _710_   _712_

Optimization Basis: Common Productivity Supplier
Single Operating System

Potential Savings: 12% Cost Savings

[ OK ] _714_   [ Implement Optimization ] _716_   [ Configure Alternative ] _720_   [ Back To Utilization ] _722_

FIG. 7

Computing Resource Service Provider Interface

Asset Management Service — Del Pueblo Estate

Optimization Analysis 818

| Application | Manufacturer | Version | Licenses | Additions |
|---|---|---|---|---|
| Bopper Management Apps | Bopper Corp. | Standard | 10 | 0 |
| Buchanan Shades OS 27 | Buckshade, LLC | Standard | 8 | 0 |
| Cubane Diver XIII | Cubane, Inc. | Standard | 15 | 0 |
| Cubane Reader X | Cubane, Inc. | Standard | 15 | 0 |
| Hardmacro Workspaces '15 | Hardmacro Corp. | Premium | 0 | -10 |
| Keydom Operating System V | Keydom, Inc. | Premium | 0 | -8 |
| Megapeth VII | Megapeth, Inc. | Premium | 0 | -8 |
| Megapeth VII | Megapeth, Inc. | Standard | 8 | 8 |

804 806 808 810 812

Optimization Basis: No Premium Versions
Potential Savings: 24% Cost Savings, 7% Memory Usage Reduction, 9% Storage Usage Reduction

[ OK ]  [ Implement Optimization ]  [ Configure Alternative ]  [ Back To Utilization ]  [ Cancel ]

SOFTWARE ASSET MANAGEMENT OF COMPUTER SYSTEMS AND VIRTUAL INSTANCES FOR REPORTING AND OPTIMIZATION

BACKGROUND

Computing resource service providers and other service providers often allow customers to utilize various software applications on computing resources that are hosted by these service providers, but otherwise managed by the customers. This provides customers with the flexibility to manage these computing resources remotely and enable other users to access these computing resources to support the customers' business needs. However, when utilizing these service providers to manage and make use of these computing resources, software asset management becomes difficult. For instance, conventional software asset management tools are generally configured for traditional models where customers own their own computer systems and available within a customer's local premises. Generally, conventional software asset management tools are not suited for service provider environments, which may be multi-tenant in nature. Further, conventional software asset management tools do not provide a single configuration mechanism for performing software asset management without the need to install any additional software.

BRIEF DESCRIPTION OF THE DRAWINGS

Various embodiments in accordance with the present disclosure will be described with reference to the drawings, in which:

FIG. 6 shows an illustrative example of an interface configured to provide analysis of software configurations of a customer's computer systems in accordance with at least one embodiment;

FIG. 7 shows an illustrative example of an interface configured to provide optimization results for one or more computer systems based at least in part on optimization preferences provided by a customer of the computing resource service provider in accordance with at least one embodiment;

FIG. 8 shows an illustrative example of an interface configured to provide optimization results for one or more computer systems based at least in part on software versions specified by a customer of the computing resource service provider in accordance with at least one embodiment;

DETAILED DESCRIPTION

Figure 1:
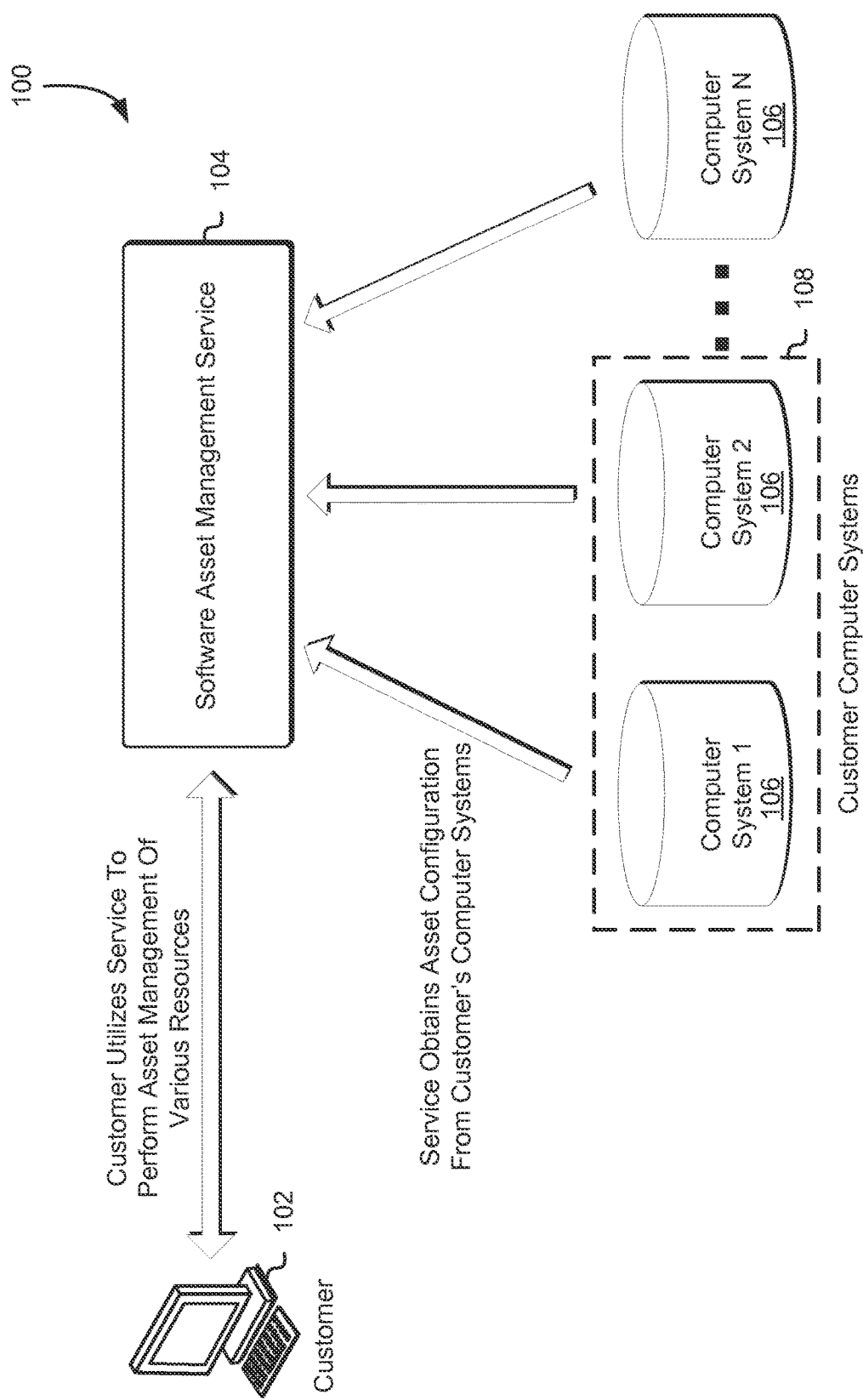
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the configuration and implementation of a software asset management service for determining software assets being utilized within resources maintained and operated by a computing resource service provider. In an embodiment, an entity (e.g., an organization or other customer), through a computing resource service provider interface, submits a request for a report of software assets for the entity's physical and virtual computer systems or other computing resources maintained by the computing resource service provider. The entity, through the request, may specify the computer systems and other computing resources that should be analyzed as part of the software asset management process. Additionally, the entity may provide pricing and other financial information for software assets that may be included within these computing resources to obtain an assessment of the financial ramifications of use of the particular software assets being utilized within these specified computer systems and computing resources. Each computer system and other computing resource may include an agent, which may be initiated when the computer system or other computing resource is provisioned. This agent may be configured to transmit software asset information to the software asset management service.

When the entity submits the request to perform software asset management for the entity's computer systems or other computing resources, the entity may use credential information to authenticate to the computing resource service provider. If the entity is successfully authenticated, the asset management service may identify any of the entity's computing resources and access a configuration database to obtain information regarding the software assets within the entity's specified computing resources as well as other configuration information that may be used as part of the software asset management process. The obtained information may be compiled and presented to the entity through the computing resource service provider interface along with any financial assessments that may have been performed utilizing the pricing and financial information provided by the entity.

In an embodiment, when the entity is presented with the software asset information through the interface, the asset management service will present the entity with the option to request performance of various optimization analyses to identify any potential savings that the entity may take advantage of. For instance, the entity may configure an optimization analysis to determine any financial return on investment comparisons between utilizing a current software asset configuration for the entity's computing resources and reconfiguration of these computing resources to utilize a limited number of software manufacturers that is fewer than those currently utilized by the entity. Additionally, through the interface, the entity may generate various scenarios for optimization that may be used to identify any potential improvements or savings that may be incurred should the software asset configuration be modified according to the entity's request.

In this manner, an entity is able to utilize software asset management tools provided by the computing resource service provider through a software asset management service to evaluate the entity's software assets across the entity's physical and virtual computer systems and other computing resources while performing any optimizations on these resources as needed. Additionally, the techniques described and suggested herein facilitate additional technical advantages. For example, because the software asset management service is provided to the entity by the computing resource service provider, the entity may utilize a single configuration setting to ensure that software asset management is enabled for all of the entity's computing resources, thereby simplifying the process for software asset management across all of the entity's resources maintained by the computing resource service provider.

FIG. 1 shows an illustrative example of an environment 100 in which various embodiments can be implemented. In the environment 100, a customer 102 may transmit, through an interface provided by a computing resource service provider, a request to a software asset management service 104 to determine the software configuration of the customer's computer systems 108 maintained by the computing resource service provider. In order for the customer 102 to interact with the interface provided by the computing resource service provider and access the software asset management service, the customer 102 may be required to provide credential information for authentication to a graphical user interface (GUI), whereby the GUI may utilize the provided credential information to generate a digital signature or hash that may be utilized for authentication. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like. The computing resource service provider may utilize the obtained digital signature or hash from the GUI to authenticate the customer 102 and determine whether the customer 102 may utilize the computing resource service provider interface to access its computer systems 108 and/or the software asset management service 104.

As will be described in greater detail below, if the customer 102 is successfully authenticated by the computing resource service provider, the computing resource service provider may configure the interface to enable the customer 102 to select from a variety of services provided by the computing resource service provider. For instance, the interface may be configured to include a graphical user interface (GUI) button for each service available to the customer 102. Through this interface, the customer 102 may select the appropriate GUI button corresponding to the software asset management service 104 in order to access the service.

Through the interface, the customer 102 may transmit a request to the software asset management service 104 to perform a software asset analysis of the customer's computer systems 108 and other computing resources maintained within the computing resource service provider network. These computer systems 108 may include physical computer systems (e.g., physical hosts) and/or virtual computer systems (e.g., virtual machine instances). These computer systems may be utilized by the customer 102 to maintain and operate various software assets within the computing resource service provider network. In some embodiments, the software asset management service 104 may further perform software asset analysis of a customer's computing resources, including physical and virtual computer systems maintained within the customer's separate, on-premises network. The customer 102 may provide pricing and other financial information for software that may be included within these computing resources. This may enable the software asset management service 104 to perform detailed financial analyses for the customer's virtual machine instances 108 and other computing resources. Additionally, this information may enable the software asset management service 104 to generate optimization scenarios based at least in part on the customer's 102 inputs within the request. For instance, a customer 102 may request a comparison between existing software asset configurations within its computing resources and software asset configurations that utilize distinct software manufacturers, software versions, and the like.

In some embodiments, the customer 102 can submit a request to the software asset management service 104 through a virtual computing system service usable to manage and maintain the customer's physical and virtual computer systems 108. For instance, as will be described in greater detail below in connection with FIG. 5, the customer 102 may utilize the provided interface to access a GUI for the virtual computer system service. This GUI may be used to launch computer systems 106, as well as determine the status of any of the customer's active computer systems 108. This GUI may include one or more buttons usable to transmit a request to the software asset management service 104 to initiate asset management for the customer's selected computer systems 108. In some instances, the customer 102 may utilize a cursor to select a particular computer system 106 and, upon selection of the computer system 106, select an option to perform asset management on the selected computer system 106. In some instances, the customer 102 may utilize the GUI to specify that it would like to initiate asset management without selecting any computer systems 106. This may cause the software asset management service 104 to perform software asset management for each of the customer's computer systems 108.

When the software asset management service 104 receives the request from the customer 102 to perform software asset management for its computer systems 108 and other computing resources, the software asset management service 104 may access a policy management service to identify the customer's computing resources and to determine whether the customer 102 is authorized to perform asset management for the selected computing resources. If the customer 102 is authorized to perform asset management for its computer systems 108 and other computing resources, the software asset management service 104 may access a configuration database to obtain the software asset configuration for each of the customer's computer systems 108.

The configuration database may be populated in response to a triggering event. For instance, the software asset management service 104 may transmit a request after a particular period of time to an agent installed on each computer system 106 that, when received by the agent, may cause the agent to transmit the software configuration information for the associated computer system 106 to the configuration database, where the software configuration information may be catalogued for use by the software asset management service 104. Alternatively, the software asset management service 104 may transmit the request to each agent upon receiving the request from the customer 102 to perform asset management for its computer systems 108 and other computing resources. The agent installed on each virtual computer system may be included within the virtual machine image utilized to instantiate the virtual computer system and may be used for monitoring the health of the virtual computer system (e.g., processor performance, physical hardware state, etc.) for the virtual computer system service. Thus, in some instances, a new agent may not be required upon instantiation of a virtual computer system to support any requests from the software asset management service 104. Similarly, each physical computer system may have installed an agent that may be used for asset management within that physical computer system and for monitoring the health of the various physical components of the physical computer system (e.g., hard drives, processors, memory, etc.). It should be noted that in some embodiments the agent within each computer system 106 can be configured to transmit software configuration information automatically to the configuration database of the software asset management service 104 after a particular period of time has passed or upon detection of a triggering event (e.g., customer 102 has opted to initial software asset management for certain computer systems 108 and computing resources).

The software asset management service 104 may utilize the obtained configuration information for the customer's computer systems 108 to compile the software assets for these computer systems 108 and present these software assets to the customer 102 for its review. These software assets may be presented to the customer 102 through the computing resource service provider interface or transmitted to the customer 102 using any other communications methods (e.g., electronic mail, electronic text message, spreadsheet application file, etc.). The customer 102 may subsequently submit an additional request to the software asset management service 104 to perform software asset optimization analyses for its computer systems 108 and other computing resources. The customer 102 may specify, through this request, one or more parameters that may be utilized by the software asset management service 104 to generate the optimization solutions. For instance, a customer 102 may specify that it would like to view an optimization solution based at least in part on central processing unit (CPU) improvements that would enable certain software assets to be used on less expensive physical hosts or smaller allocation units within these physical hosts. The customer 102 may further provide pricing and other financial information that may be used by the software asset management service 104 to calculate any price changes resulting from the optimization solution.

Once the software asset management service 104 has determined one or more optimization solutions based at least in part on the customer's request and the provided optimization parameters, the software asset management service 104 may provide the one or more optimization solutions to the customer 102. Further, the software asset management service 104 may enable the customer 102 to determine whether any of the optimization solutions presented may be performed. For instance, if the customer 102 determines that a particular optimization solution is ideal and should be implemented, the customer 102 may transmit a request to the software asset management service 104 through the interface to request reconfiguration of the software assets to satisfy the particular optimization solution. The software asset management service 102 may transmit one or more requests, such as through one or more application programming interface (API) calls, to the virtual computer system service to perform the necessary changes to the customer's computer systems 108 to have a software asset configuration that satisfies the optimization solution selected by the customer 102.

Figure 2:
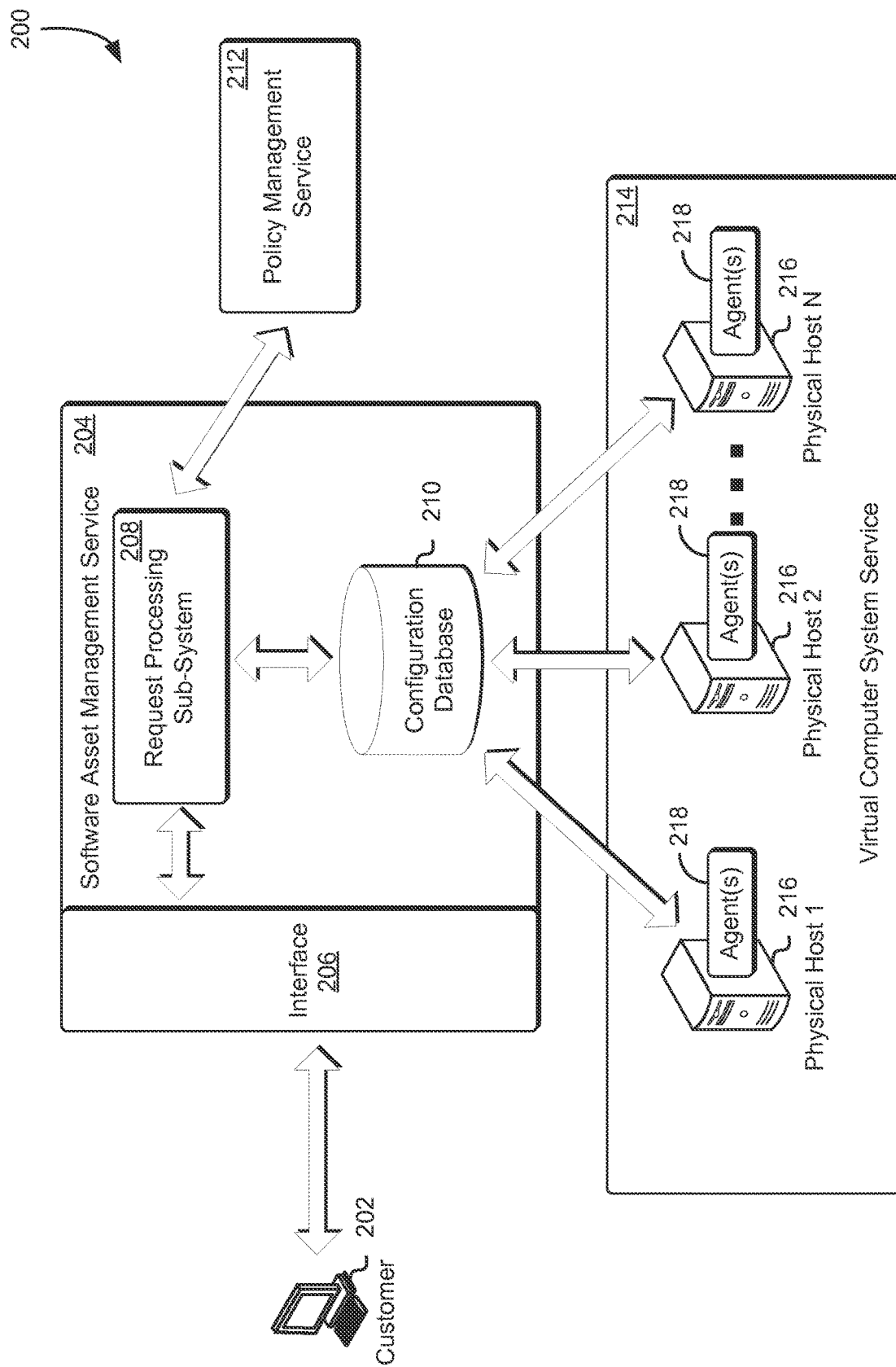
FIG. 2 shows an illustrative example of an environment in which an asset management service obtains computer system configuration information for various computer systems and responds to customer requests in accordance with at least one embodiment.

As noted above, a customer may submit a request to a software asset management service to perform software asset management for the customer's physical and virtual computer systems and other computing resources. These computer systems and computing resources may be provided and maintained by a virtual computer system service. This may require the software asset management service to communicate with these computer systems in order to perform software asset management for the customer's computing resources. Accordingly, FIG. 2 shows an illustrative example of an environment 200 in which a software asset management service 204 obtains computer system configuration information for various computer systems and responds to customer requests in accordance with at least one embodiment.

In the environment 200, a customer 202 may transmit a request to the software asset management service 204 to perform software asset management and obtain computer system configuration information for the customer's computer systems. The software asset management service 204 may include an interface 206, which may be incorporated into the computing resource service provider interface and may be used by the customer 202 to submit its request. In some embodiments and as will be described in greater detail below in relation to FIG. 5, the customer 202 is redirected to the software asset management service interface 206 if it submits a request to perform software asset management through a virtual computer system service interface. This may enable the customer 202 to identify one or more computer systems that are to be analyzed by the software asset management service 204 in response to the customer's request.

In order to access the interface 206, the customer 202 may be required to provide credential information to the interface 206. The interface 206 may utilize the provided credential information to generate a digital signature or hash. The interface 206 may provide this digital signature or hash to the software asset management service 204, which may determine whether the customer 202 is authorized to have the software asset management service 204 perform the requested software asset management on the targeted computer systems. The software asset management service 204, through a request processing sub-system 208, may obtain this digital signature or hash from the interface 206. Subsequently, the request processing sub-system 208 may transmit a request, along with the provided digital signature or hash, to a policy management service 212 to perform the authorization process for the customer 202. The policy management service 212 may utilize the provided digital signature or hash to determine the identity of the customer 202, as well as identify any policies associated with the customer's 202 physical and virtual computer systems, as well as any other computing resources. These policies may specify a level of access for the customer 202, particularly any administrative actions that may be deemed permissible for the customer 202 or any other user of the customer's computer systems. Thus, the policy management service 212, through these policies, may determine whether the customer 202 is authorized to request performance of software asset management for the specified computer systems.

If the customer 202 is authorized to have the software asset management service 204 perform software asset management for its computer systems, the request processing sub-system 208 may access a configuration database 210 to obtain configuration information for each of the customer's computer systems and other computing resources. The configuration database 210 may include entries for each computer system, including physical hosts 216 within a virtual computer system service 214 and virtual machine instances that may be instantiated on these physical hosts 216. For instance, an entry within the configuration database 210 may correspond to a particular computer system within the virtual computer system service 214. This entry may specify the software configuration of the particular computer system, as well as other information usable to identify the computer system (e.g., physical host 216 used to instantiate a virtual computer system, unique identifier of the physical or virtual computer system, name given to the physical or virtual computer system by the customer 202, etc.). It should be noted that the plurality of physical hosts 216 may be used to provide a hosted compute service to multiple customers of the computing resource service provider. For instance, the hosted compute service may include the virtual computer system service 214 or any other computer system service that enables customer a choice of provisioning a physical computer system (e.g., host) and/or a virtual computer system (e.g., virtual machine instance).

In an embodiment, the physical hosts 216 operated and maintained by the virtual computer system service 214 each include an agent 218 configured to collect software information for the physical host 216. Additionally, each virtual machine instance instantiated in the physical host 216 may also include an agent which may be configured to collect software information for that particular instance. This virtual machine instance agent may be configured to collect this information in response to a triggering event (e.g., receipt of a request from the request processing sub-system 208, detected change in the software configuration of the associated instance, etc.) or after a particular period of time has passed (e.g., every hour, every day, every week, etc.). The physical host agent 218 for each physical host 216 may also be configured to collect this information in response to a triggering event or after a particular period of time has passed. Each agent, whether from the physical computer system or the virtual computer system, may transmit the software configuration information to the configuration database 210 where the information may be compiled and catalogued.

It should be noted that the physical hosts 216 may be maintained within the customer's own on-premises network. The configuration database 210 may thus obtain software configuration information from computer systems located within the computing resource service provider network (e.g., the virtual computer system service 214) and from the customer's on-premises network. This may enable the software asset management service 204, during performance of one or more optimization analyses, as will be described below, to identify any differences between software asset configurations within the on-premises network and within the virtual computer system service 214.

The request processing sub-system 208 may obtain the configuration information for the customer's computer systems from the configuration database 210. Subsequently, the request processing sub-system 208 may compile the software assets specified for each of the customer's computer systems to generate a report that can be used by the customer 202 for its software asset management. The request processing sub-system 208 may present this report to the customer 202 through the interface 206. In some embodiments, the request processing sub-system 208, through the interface 206, will present the customer 202 with an option to perform one or more optimization analyses based at least in part on the reported software assets. For instance, a customer 202 may specify one or more parameters that may be used by the request processing sub-system 208 to generate one or more optimization solutions for the customer's software assets. The customer 202, through the interface 206, may further provide pricing and other financial information that may be used to quantify the impact of certain optimizations and enable the customer 202 to determine which optimization solution is more favorable for its purposes. Once the request processing sub-system 208 has generated the one or more optimization solutions for the customer's software assets, the request processing sub-system 208 may present the one or more optimization solutions to the customer 202 through the interface 206. This may enable the customer 202 to determine whether software asset optimization is to be performed for its computer systems.

Figure 3:
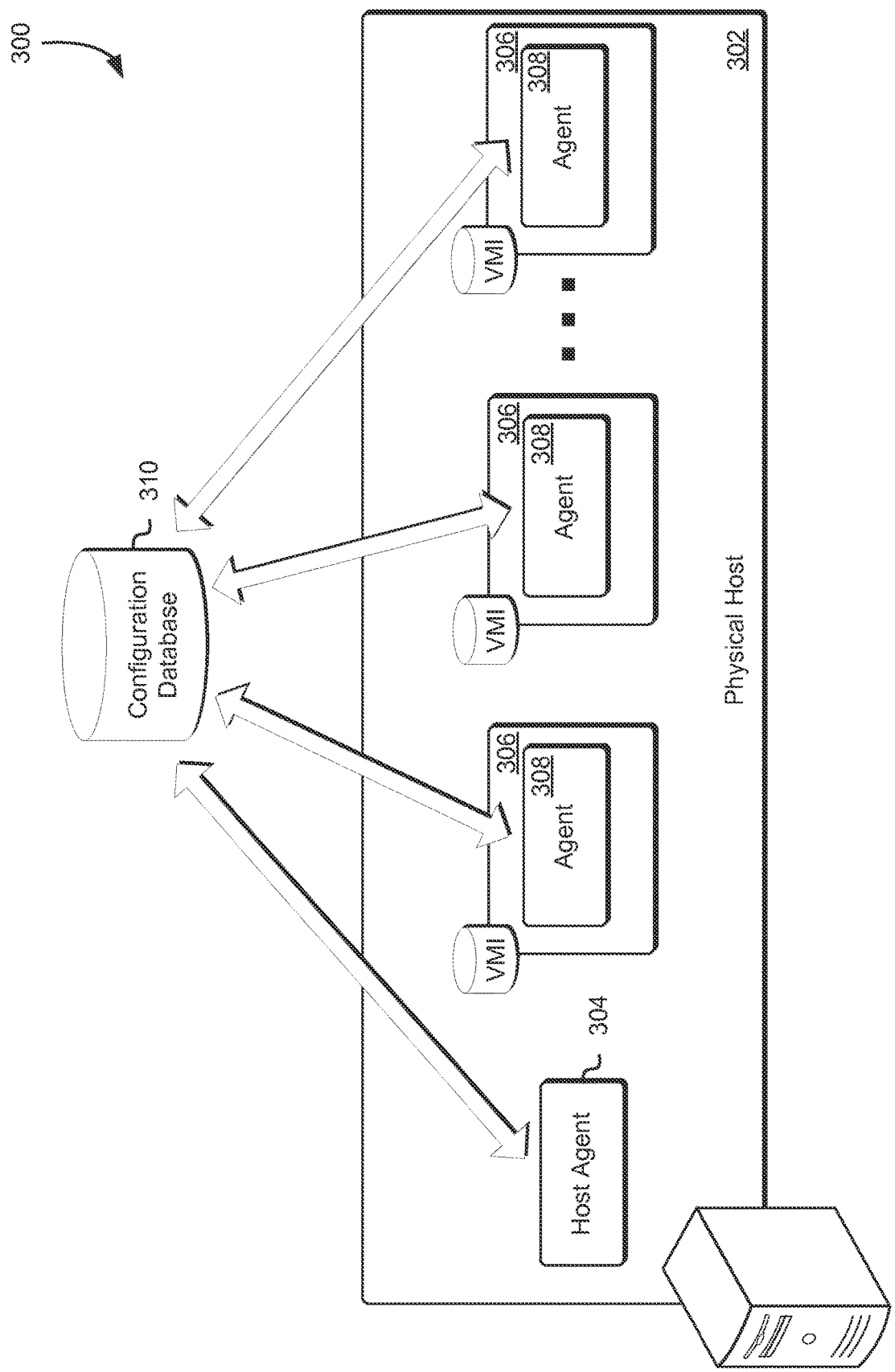
FIG. 3 shows an illustrative example of an environment in which agents for a variety of computer systems obtain configuration information for various computer systems within a physical host in accordance with at least one embodiment.

As noted above, each computer system may include an agent configured to determine the software configuration of the computer system. This agent may be configured to transmit this software configuration information to a configuration database of the software asset management service. Accordingly, FIG. 3 shows an illustrative example of an environment 300 in which agents 304, 308 for a variety of computer systems obtain configuration information for various computer systems within a physical host 302 in accordance with at least one embodiment.

In the environment 300, the physical host 302 may include one or more virtual machine instances 306 instantiated using physical hardware of the physical host 302. For instance, a customer of the computing resource service provider may access a virtual computer system service to select a virtual machine image that is to be instantiated onto a physical host 302. The customer may specify, within the request to the virtual computer system service, the physical hardware that may be allocated for the instantiation of the virtual machine image. This may enable the virtual computer system service to identify a physical host 302 that has the capacity to support the virtual machine instance 306 to be instantiated based at least in part on the customer's request. The customer may alternatively specify within the request to the virtual computer system service that a physical host 302 is to be provisioned exclusively for the customer's use.

When a virtual machine instance 306 is initiated within the physical host 302, an agent 308 may be initialized. This agent 308 may be configured to monitor the status of the virtual machine instance 306, as well as the hardware utilized to support the virtual machine instance 306 (e.g., processor usage, memory usage, storage capacity, etc.) and the operation of any software utilized by the virtual machine instance 306 on behalf of the customer. In an embodiment, the agent 308 is further configured to evaluate the software configuration of the virtual machine instance 306 for the purpose of asset management. For instance, the agent 308 may detect a triggering event that may cause the agent 308 to collect the software asset information for the virtual machine instance 306 and transmit this information to the configuration database 310. For example, if the customer or other user of the virtual machine instance 306 performs one or more operations that results in a change to the software configuration of the virtual machine instance 306, the agent 308 may record this configuration change and transmit this updated record to the configuration database 310.

In an embodiment, the physical host 302 maintains a physical host agent 304, which is configured to obtain software configuration information for the physical host 302 and transmits this information to the configuration database 310. A request may be transmitted to the agents 304, 308 to collect software configuration information in response to a triggering event. For instance, the physical host agent 304 and the virtual machine instance agents 308 may receive a request from a request processing sub-system of the software asset management service to obtain updated software configuration information for particular virtual machine instances 306 within the physical host 302 and the physical host 302 itself. Alternatively, the physical host agent 304 and the virtual machine instance agents 308 may receive a request from the request processing sub-system to obtain software configuration information after a particular period of time has elapsed. Once the physical host agent 304 and the virtual machine instance agents 308 have obtained the software configuration information for the various computer systems, the agents 304, 308 may transmit the collected software configuration information to the configuration database of the software asset management service. This may result in the configuration database being updated to include the latest software configuration information for each computer system within the physical host 302.

Figure 4:
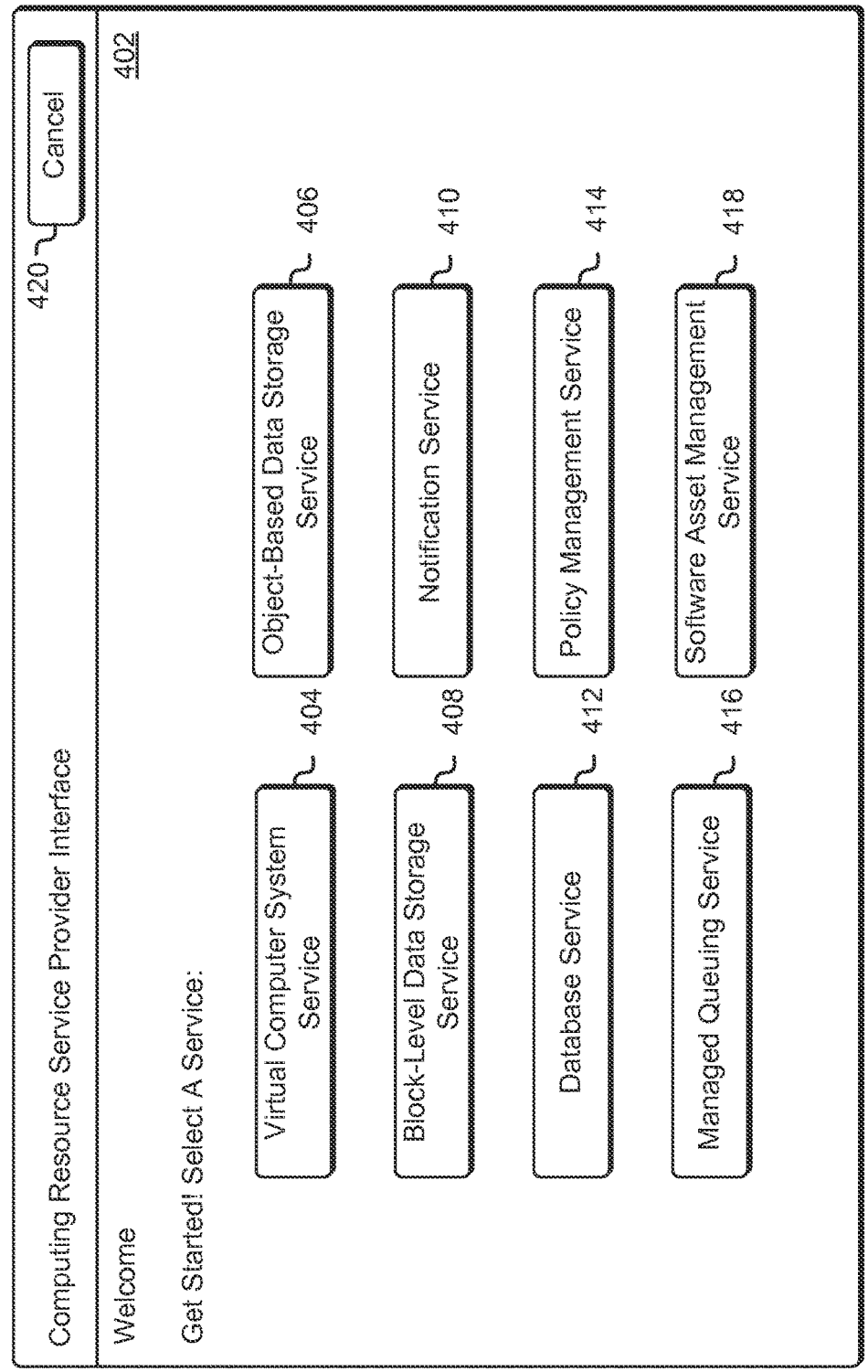
FIG. 4 shows an illustrative example of an interface configured to enable customers to access one or more services provided by the computing resource service provider in accordance with at least one embodiment.

As noted above, a customer may interact with a computing resource service provider interface in order to access one or more services provided by the computing resource service provider. The customer may be required to provide credential information to an interface of the computing resource service provider, which may generate a digital signature or hash of this set of credentials to enable the computing resource service provider to authenticate the customer and determine whether the customer is authorized to access the one or more services provided by the computing resource service provider. Accordingly, FIG. 4 shows an illustrative example of an interface 400 configured to enable customers to access one or more services provided by the computing resource service provider in accordance with at least one embodiment. Through the interface 400, a computing resource service provider may provide a variety of services to a customer.

As noted above, a computing resource service provider may provide various computing resource services to its customers through the interface 400. For instance, in this particular illustrative example, the computing resource service provider provides at least eight types of services. The computing resource service provider, through the interface 400, may provide customers with GUI buttons for each service available to the customer. For example, the interface 400 may include a virtual computer system service button 404, an object-based data storage service button 406, a block-level data storage service button 408, a notification service button 410, a database service button 412, a policy management service button 414, a managed queuing service button 416, and a software asset management service button 418, although not all embodiments of the present disclosure will include all such services and additional services may be provided in addition to or as an alternative to services explicitly described herein. The interface 400 may further include a cancel button 420, which may be used to terminate the interface 400 or otherwise cancel any pending operations requested by the customer.

The virtual computer system service, represented by the virtual computer system service button 404 within the services window 402 of the interface 400, may include a plurality of physical hosts configured to instantiate virtual machine instances onto virtual computer systems on behalf of the customers of the computing resource service provider. Customers of the computing resource service provider may interact with the virtual computer system service to provision and operate virtual computer systems that are instantiated on physical computing devices hosted (e.g., servers) and operated by the computing resource service provider. The virtual computer systems may be used for various purposes, such as to operate as servers supporting a website. Other applications for the virtual computer systems may be to support database applications, electronic commerce applications, business applications and/or other applications.

In an embodiment, each virtual computer system and each physical host includes an agent configured to determine the software configuration for each virtual computer system and each physical host, respectively. For instance, when a customer submits a request to perform software asset management for its computer systems, these agents may obtain the software configuration information for the customer's computer systems and provide this information to a configuration database of a software asset management service. Subsequently, the software asset management service may obtain this configuration information from the configuration database to respond to the customer's request. In some embodiments, the physical and virtual computer system agents are configured to collect software configuration information from the physical and virtual computer systems, respectively, in response to a triggering event. For instance, if an agent detects a change to the software configuration of a virtual computer system, the agent may collect the new software configuration information and transmit this information to the configuration database of the software asset management service. Alternatively, the agent may be configured to obtain software configuration information after a particular period of time has passed.

The object-based data storage service, represented by the object-based data storage service button 406, may enable customers to store data within computing resources within logical data containers. The data stored in the data storage service may be organized into data objects. The data objects may have arbitrary sizes except, perhaps, for certain constraints on size. Thus, the object-based data storage service may store numerous data objects of varying sizes. The object-based data storage service may operate as a key value store that associates data objects with identifiers of the data objects which may be used by the customer to retrieve or perform other operations in connection with the data objects stored by the object-based data storage service. Access to the object-based data storage service may be through appropriately configured API calls.

The block-level data storage service, represented by the block-level data storage service button 408, may provide customers with persistent block-level storage volumes for use with other services provided by the computing resource service provider. For instance, the block-level data storage system may be configured to provide block-level data storage volumes for use with a virtual machine instance. A customer may interact with the block-level data storage service to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

The notification service, represented by the notification service button 410, may enable customers to send notifications to large numbers of recipients or other distributed networks and receive notifications through a communications network. A customer may utilize an interface, provided by the computing resource service provider, to create or subscribe to one or more subjects to which one or more messages may be published through. For instance, a customer may use the interface to create a new subject and subscribe to this subject by specifying that any messages published to the subject may be transmitted to a particular location (e.g., electronic mail address, one or more servers, an existing queue within the managed queuing service, etc.). Accordingly, when a customer, through a device configured to publish messages using the notification service, publishes a message to the subject, the message may be transmitted to each recipient subscribed to the subject.

The database service, represented by the database service button 412 may support document and key-value data models through operation of one or more databases for one or more customers. Customers of the computing resource service provider may operate and manage a database from the database service by utilizing appropriately configured API calls. This, in turn, may allow a customer to maintain and potentially scale the operations in the database.

The policy management service, represented by the policy management service button 414, may provide a variety of services to enable customers to define a level of access to other services, such as those illustrated in FIG. 4, provided by the computing resource service provider and to define a level of access to resources provided by the customers and other entities. Accordingly, a customer may access the policy management service to create and manage one or more users and groups that may utilize the services provided by the computing resource service provider. A customer may utilize the identity management service to generate one or more policies, which may be used to define a level of access to resources and services. Additionally, for each customer and user of the services provided by the computing resource service provider, the identity management service may maintain an expected hash or digital signature, which may be compared to the provided hash or digital signature obtained from the interface 400 to authenticate a customer or user prior to enabling access to any other service provided by the computing resource service provider.

The managed queuing service, represented by the managed queuing service button 416, may enable customers to store one or more messages in queues for use by one or more services provided by the computing resource service provider. Each message that is stored in a queue may comprise one or more appropriately configured API calls which, when processed by the recipient service, may cause the service to perform one or more actions. Alternatively, each message may comprise any variation of text, such as programming code, Uniform Resource Locators (URLs) for data objects and other statements.

The software asset management service, represented by the software asset management service button 418, may include a request processing sub-system configured to receive and process customer requests for software asset management of their physical and virtual computer systems. For instance, when a customer of the computing resource service provider transmits a request to the software asset management service to perform software asset management for one or more computer systems, the request processing sub-system may interact with the policy management service to determine, based at least in part on the digital signature or hash of the customer's set of credentials, whether the customer is authorized to enable the software asset management service to fulfill the request.

In an embodiment, if the customer is authorized to have the software asset management service perform software asset management for its computer systems, the request processing sub-system will access a configuration database in order to compile the software configuration information for the customer's computer systems. If the information is not available within the configuration database or the information is obsolete, the request processing sub-system may transmit a request to each physical host agent and/or each virtual computer system agent to obtain the necessary software configuration information. This may cause the physical host agents and the virtual computer system agents to obtain the software configuration information for the various computer systems maintained by the virtual computer system service and provide this information to the configuration database. Thus, the configuration database may be updated to include the latest software configuration information available for each computer system, enabling the request processing sub-system to obtain the requested software configuration information and generate a compiled report that may be presented to the customer.

Figure 5:
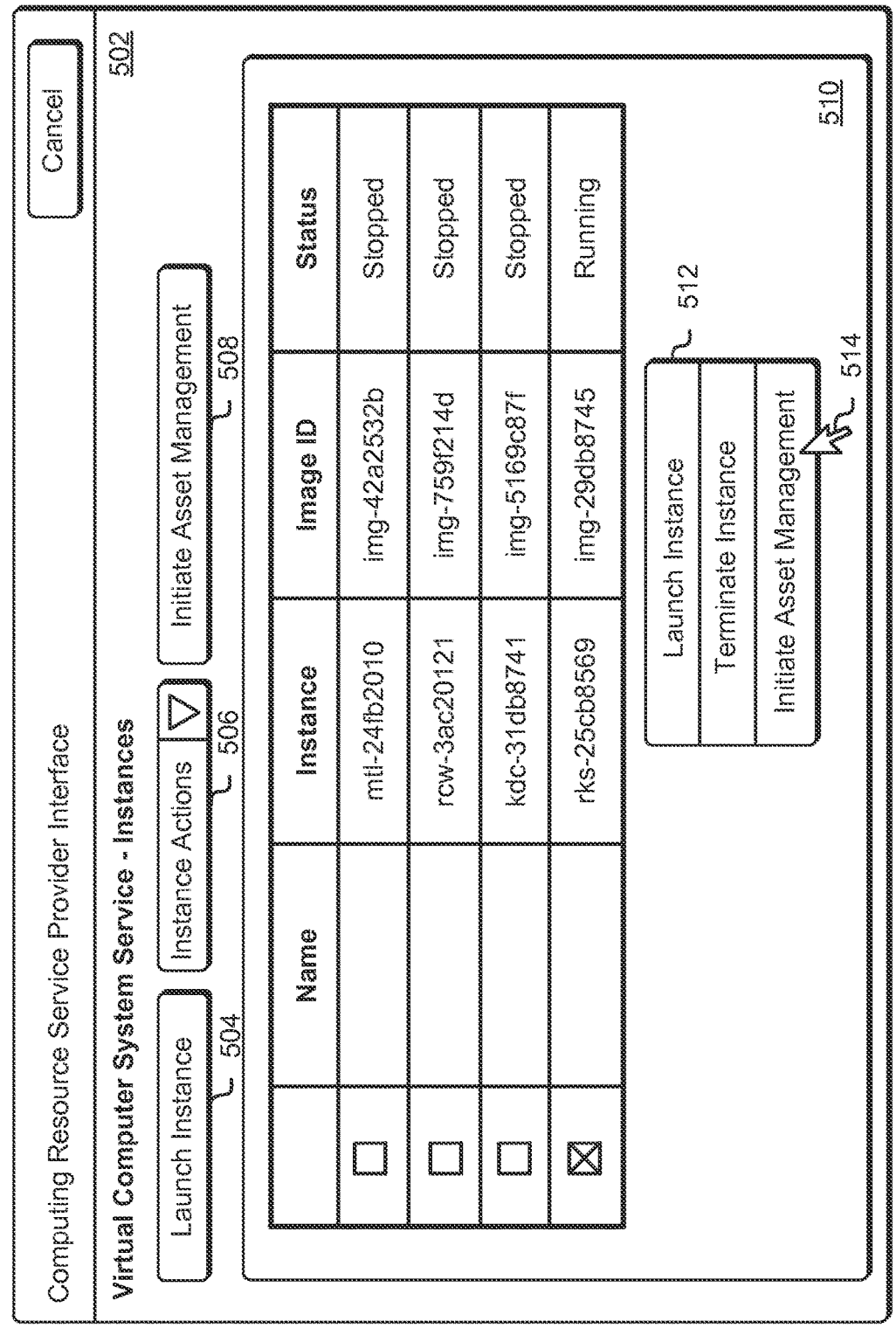
FIG. 5 shows an illustrative example of an interface configured to enable customers to initiate asset management for one or more computer systems in accordance with at least one embodiment.

As noted above, a customer may request performance of software asset management for various virtual machine instances through interaction with a virtual computer system service GUI. For instance, through the virtual computer system service GUI, a customer may select one or more virtual machine instances that are to be analyzed as part of the software asset management process and access the software asset management service to evaluate any results generated in response to the request. Accordingly, FIG. 5 shows an illustrative example of an interface 500 configured to enable customers to initiate asset management for one or more computer systems in accordance with at least one embodiment. As described above in connection with FIG. 4, a customer of the computing resource service provider may utilize the interface 500 to access one or more services provided by the computing resource service provider. For instance, if the customer selects the virtual computer system service button from the interface 500, the interface 500 may generate a virtual computer system service GUI 502, which the customer may use to interact with its virtual machine instances, physical computer systems and other computing resources.

The virtual computer system service GUI may include one or more buttons that may be used by the customer to manage its virtual machine instances. For instance, as illustrated in FIG. 5, the virtual computer system service GUI may include a launch instance button 504, which, when selected, may enable the customer to launch an existing instances described within the instance window 510. If the customer does not have any active virtual machine instances, the customer may be redirected to a virtual machine image marketplace, where the customer may select a virtual machine image for instantiation onto a physical host. When the customer selects a virtual machine image from the marketplace, it may select a custom name for the virtual machine instance to be instantiated, as well as the physical hardware that should be used to support and maintain the virtual machine instance. The virtual computer system service may utilize this information to identify a physical host that may be utilized to instantiate the virtual machine instance. Subsequently, the virtual computer system service may populate the instance window 510 to include this newly instantiated virtual machine instance for the customer.

The instance actions button 506 may enable the customer to perform one or more actions with regard to any of its existing virtual machine instances. For instance, if the customer selects the instance actions button 506 within the virtual computer system service GUI 502, it may be presented with various options for operations that may be performed for any virtual machine instance specified within the instance window 510. Through selection of the instance actions button 506, a customer may request deletion of one or more virtual machine instances, pausing of one or more virtual machine instances, resumption of one or more virtual machine instances, and the like.

The virtual machine instance GUI may further include an initiate asset management button 508, which may be used to submit a request to the software asset management service to perform software asset management for one or more virtual machine instances, as selected by the customer through the instance window 510. When the customer selects the initiate asset management button 508, the customer may be presented with an asset management GUI, as illustrated in FIGS. 6 and 7, whereby the customer may review the software assets for the selected virtual machine instances and request optimization analyses as needed in order to determine any potential cost savings that may be made by changing the software configuration of any virtual machine instances specified by the customer in the request for software asset management. In some embodiments, if the customer selects the initiate asset management button 508, the customer may review the software assets for all of its virtual machine instances, physical computer systems, and other computing resources maintained by the virtual computer system service.

As an alternative to the initiate asset management button 508, a customer may utilize its cursor 514 to select an entry for a virtual machine instance within the instance window 510, which may cause the virtual computer system service GUI 502 to present a menu 512 of possible operations that may be performed. For instance, through this menu 512, a customer may utilize the cursor 514 to launch one or more virtual machine instances, terminate virtual machine instances, or perform asset management for one or more virtual machine instances. It should be noted that while these operations are illustrated within the menu 512, the menu 512 may include alternative and/or additional operations that may be performed. If the customer selects the initiate asset management option from the menu 512, the customer may be presented with the asset management GUI where it may review the software configuration for the selected virtual machine instances. Thus, the menu 512 may serve as an additional method for accessing the software asset management service from the virtual computer system service GUI 502.

It should be noted that in some embodiments, the virtual computer system service GUI 502 may specify, in addition to and/or instead of virtual machine instances, physical computer systems (e.g., physical hosts) that may be used to instantiate these virtual machine instances or used as a standalone resource for a customer's needs. For instance, within the instance window 510, the GUI 502 may generate an additional table or other display method to illustrate any existing physical computer systems that may be maintained by the virtual computer system service on behalf of the customer. Alternatively, the GUI 502 may present to the customer an alternative window, which may be used to present any physical computer systems available to the customer. The implementation of this alternative window may be similar to that of the instance window 510, enabling the customer to utilize its cursor 514 to select any physical computer systems and specify, through the menu 512, whether to initiate asset management for the selected physical computer systems.

As noted above, through the software asset management service, a customer may submit a request to perform software asset management for one or more virtual machine instances, physical computer systems and other computing resources. In response to this request, the software asset management may access a configuration database to obtain software configuration information for each of the selected virtual machine instances, physical computer systems and/or other computing resources. This information may be compiled into a format that may be viewed and understandable by the customer. Accordingly, FIG. 6 shows an illustrative example of an interface 600 configured to provide analysis of software configurations of a customer's computer systems in accordance with at least one embodiment. The interface 600 may include a software asset management service GUI 602, which a customer may utilize to review the software configuration for any selected computer systems and request performance of optimization analyses for these computer systems, if so desired.

The software asset management service GUI 602 may include a report window 618, which may be used to illustrate the software configuration for any of the customer's computer systems. As illustrated in FIG. 6, the report window 618 may include a chart specifying the various software applications used within the customer's computer systems, as well as any available licenses for these applications. For instance, the chart may include an application column 604, which may be used to specify the name of the software application detected within at least one computer system and/or available to the customer for its computer systems by virtue of existing available licenses.

The manufacturer column 606 may specify the manufacturer of the corresponding software application specified within the application column 604. This may help the customer determine common manufacturers for various software applications used through the various computer systems. Similarly, the category column 608 may enable the customer to identify applications that share the same application category. This may allow the customer to determine any redundancies within its computer systems and identify any potential areas for optimization.

In addition to the aforementioned columns, the software configuration chart illustrated within the report window 618 may include a licenses purchased column 610 and a licenses in use column 612. The licenses purchased column 610 may specify, for each software application entry, the number of licenses purchased by the customer or otherwise usable by the customer for its computer systems. The licenses in use column 612 may be utilized to illustrate the number of software application licenses that are currently in use within the customer's computer systems. Thus, based at least in part on the number of licenses purchased and the number of licenses in use, a customer may determine the number of licenses available for particular software applications. This, in turn, may enable the customer to determine whether there are any licenses that it may terminate in order to reduce its financial burden in operating the computer systems analyzed by the software asset management service. It should be noted that the columns illustrated within the report window 618 are not exhaustive and additional or alternative columns may be included within the report window 618. For instance, the chart within the report window 618 may specify the application edition, application version, a unique application identifier, number of application users, and the like.

In addition to the report window 618, the software asset management service GUI 602 may further include an OK button 614, which may be used to acknowledge that the customer has viewed the report presented within the report window 618. Alternatively, the customer may select the OK button 614 to return to the initial computing resource service provider interface 600, enabling the customer to select another service to access for its needs. This may include accessing the virtual computer system service to perform any actions deemed necessary based at least in part on the software asset management report presented to the customer through the report window 618.

The optimization analysis button 616, when selected, may enable the customer to request performance of one or more optimization analyses by the software asset management service. When the customer selects the optimization analysis button 616, the customer may be prompted by the software asset management service to define one or more parameters that may be utilized to perform the optimization analyses and generate optimized results based at least in part on these one or more parameters. For instance, a customer may specify, through the GUI 602, that it would prefer to have a single manufacturer for certain categories of applications. Alternatively, the customer may specify, through the GUI 602, that the computer systems may be optimized based at least in part on the greatest reduction of CPU and/or memory usage. A customer may specify, through the GUI 602, that the optimization solution to be generated should aim to optimize the versions of particular software assets within the various computer systems. The customer may further specify that the optimization solution should consider transferring existing computer systems to physical hosts with lesser hardware capabilities that may not have a detrimental impact on the computer systems while having the benefit of using less expensive hardware. Once the customer has specified the various parameters to be used to generate the optimization solutions, the software asset management service may update the GUI 602 to display the one or more optimization solutions.

As noted above, once the customer has selected the optimization analysis button from the software asset management service GUI and has specified the one or more parameters to be utilized by the request processing sub-system to generate the one or more optimization solutions, the request processing sub-system may evaluate the software configuration for the customer's computer systems and generate one or more optimization solutions. The request processing sub-system may update the software asset management service GUI and the report window of the GUI to provide the customer with the one or more optimization solutions generated. Further, the request processing sub-system may present the customer with one or more options to perform the optimization presented in the report window or initiate additional and/or alternative optimization analyses. Accordingly, FIG. 7 shows an illustrative example of an interface 700 configured to provide optimization results for one or more computer systems based at least in part on optimization preferences provided by a customer of the computing resource service provider in accordance with at least one embodiment.

In this illustrative example, the customer has specified that an optimization solution is to be generated based at least in part on the commonality of a software application supplier for productivity applications and the use of a single operating system. In the generation of an optimization solution, the report window 718 may be configured to display these specified parameters in order to enable the customer to determine the bases for optimization. In some embodiments, a customer can provide pricing and other financial information to the software asset management service in order to determine the cost basis for the original software configuration, the optimized software configuration solutions, and the net impact of performing the optimization, if so desired. For instance, as illustrated in FIG. 7, this particular optimization solution as presented in the report window 718 may net the customer a 12% cost savings compared to its present software configuration for its computer systems. It should be noted that additional and/or alternative bases for optimization may be specified by the customer to achieve an optimization solution. For instance, a customer may specify, through the GUI 702, that it wants to optimize the usage of storage capacity and available memory for its software assets. Alternatively, the customer may specify, through the GUI 702, use of particular versions and/or editions of software, which may have collateral impact on cost and computing resource usage.

In another embodiment, the optimization analysis solution presented within the report window 718 can be based at least in part on software configurations used by other customers and/or users. For instance, the software asset management service may obtain anonymized data for one or more other customers that may utilize similar computer systems and/or software assets to the customer submitting the optimization request. Based at least in part on this data, the software asset management service may provide an optimization solution through the report window 718. For example, if a significant number of customers utilize particular software assets for their computer systems, the software asset management service may generate an optimization solution that mirrors the software asset configuration for these other customers. As an illustrative example, if 91% of customers having the same or similar software asset configurations as the customer only have a certain number of licenses of a particular software asset, the software asset management service may generate an optimization solution that specifies that the customer's software assets should be configured to only have that certain number of licenses of the particular software asset. Alternatively, if these other customers do not maintain licenses for a particular software asset, the software asset management service may provide an optimization solution that would eliminate any existing licenses for this particular software asset.

The optimization analysis solution presented within the report window 718 may include additional features to enable the customer to clearly identify the possible optimization actions that may be performed to achieve the potential savings. For instance, using the chart generated during the software asset management process described above in connection with FIG. 6, the request processing sub-system may alter any software application entries within the application column 704, the manufacturer column 706, the category column 708, the licenses purchased column 710, and the licenses in use column 712. As illustrated in the report chart of FIG. 7, the optimization solution presented within the report window 718 suggests that the Keydom Operating System V and the Megapeth VII Premium operating systems, as well as the Hardmacro Workspaces '15 productivity suite, should be removed from any virtual machine instances in order to optimize these computer systems according to the customer's specified parameters for optimization. This may include terminating any existing licenses for these software applications. Thus, the request processing sub-system may strikethrough the entries corresponding to these applications to demonstrate that these applications should be terminated in order to achieve the optimized solution. It should be noted that the request processing sub-system may utilize additional and/or alternative methods to illustrate the elimination of one or more applications within the report window 718. For instance, the request processing sub-system may utilize alternative font color schemes, increasing the presentation opacity of the affected entries, shading of the report chart cells corresponding to the affected entries, and the like.

In addition to identifying any applications that are to be terminated as part of the optimization solution, the request processing sub-system may highlight or otherwise draw attention to existing and/or new software applications that have been used to replace any of the terminated applications. For instance, as illustrated in FIG. 7, the software application entries for Cubane Diver XIII and Cubane Reader X have been highlighted by utilizing a bold font face for these entries. The entries within the licenses in use column 712 for these applications have not been modified. This may denote that the customer should purchase additional licenses for these applications, as they may be needed in order to configure the optimization solution presented. However, the licenses being utilized for these software applications may remain the same for the optimization solution, resulting in no highlighting of these entries within the licenses in use column 712.

Alternatively, if the request processing sub-system determines that additional licenses are required for an existing application and that these additional licenses are to be utilized as part of the optimization solution, the request processing sub-system may highlight the complete software application entry. For instance, as illustrated in FIG. 7, to achieve the optimization solution presented, the customer should obtain and utilize additional licenses for the Buchanan Shades OS 27 operating system. Thus, the entry for this application is highlighted through use of a bold font face for each of the column entries. If a new application is introduced as part of the optimization solution (e.g., Cubane Cubicle '15, as illustrated in FIG. 7), the request processing sub-system may generate a new entry for this software application and highlight the entry to enable the customer to clearly note the introduction of this application. It should be noted that while bold font faces are utilized extensively throughout the present disclosure for the purpose of illustration, other highlighting methods may be utilized. For instance, the request processing sub-system may change the font color, report chart cell shading and color, font face, and the like for any modified or new entries.

In addition to modifications to the report chart within the report window 718, the request processing sub-system may present the customer with various options through the software asset management service GUI 702. For instance, the GUI 702 may include an OK button 714, which the customer may utilize to acknowledge that it has reviewed the report presented. Additionally, the GUI 702 may include an implement optimization button 716, which the customer may utilize to request implementation of the presented optimization solution to the affected one or more computer systems. By selecting the implement optimization button 716, the request processing sub-system may access the virtual computer system service and request performance of one or more operations that may result in modification of the one or more computer systems consistent with the optimization solution presented to the customer. Alternatively, the implement optimization button 716, when selected, may enable the customer to access the computer systems that may be impacted by implementation of the optimization solution. This may enable the customer to manually implement the changes prescribed within the report window 718.

The configure alternative button 720 may enable the customer to define one or more parameters for a new optimization solution. When the customer selects the configure alternative button 720, the software asset management service GUI 702 may present the user with one or more options for defining the parameters to be used by the request processing sub-system to generate a new optimization solution. This new solution may replace the solution presented in the report window 718. In some embodiments, when a new optimization solution is generated, the report window 718 may be modified to include GUI tabs usable to alternate between existing optimization solutions. This may enable the customer to compare optimization solutions to identify the best solution for its needs. The GUI 702 may further include a back to utilization button 722, which, when selected, may modify the GUI 702 to present the original software asset management report, such as the report chart illustrated in FIG. 6. It should be noted that the GUI 702 may include additional and/or alternative buttons than those presented in FIG. 7. For instance, the GUI 702 may further include a button that, when selected, may enable the customer to access a distinct service provided by the computing resource service provider that may be configured to perform one or more operations to reconfigure its computer systems to achieve the presented optimization solution.

FIG. 8 shows an illustrative example of an interface 800 configured to provide optimization results for one or more computer systems based at least in part on preferred software versions specified by a customer of the computing resource service provider in accordance with at least one embodiment. In this illustrative example, the customer has specified that, as an optimization parameter, no premium or otherwise advanced version of a software asset may be utilized within its computer systems. For instance, a customer may wish to only utilize standard versions of particular software assets to minimize cost, reduce resource usage for its computer systems, and/or eliminate unnecessary features that the customer may not be using.

The interface 800, similar to the interface illustrated in FIG. 7, may include a software asset management service GUI 802. This software asset management service GUI 802 may further include a report window 818, which may be configured to display the optimization parameters specified by the customer in order to enable the customer to determine the bases for optimization. In order to generate the optimization solution reported within the report window 818, the customer may have specified the use of no premium versions of software assets. Further, the customer may specify, through the GUI 802, the cost basis for any existing software assets in order to enable the software asset management service to determine any cost savings for the optimization solution generated. This may cause the software asset management service to determine the cost basis for the original software configuration, the optimized software configuration solutions, and the net impact of performing the optimization, if so desired. Further, the software asset management service may identify any resource usage savings based at least in part on previously performed benchmark analyses for various software assets. For instance, as illustrated in FIG. 8, this particular optimization solution as presented in the report window 818 may net the customer a 24% cost savings, 7% memory usage reduction, and 9% storage usage reduction compared to its present software configuration for its computer systems. It should be noted that based at least in part on the optimization parameters specified by the customer, the optimization solution may not be the optimal solution that could be generated. For instance, the optimization solution may not represent the maximum cost, memory, and/or storage usage savings compared to other possible optimization solutions and, in some cases, the optimization solution may result in negative or negligible savings.

The optimization analysis solution presented within the report window 818 may include additional features to enable the customer to clearly identify the possible optimization actions that may be performed to achieve the identified optimization solution. For instance, the request processing sub-system may generate a new chart based at least in part on the chart generated during the software asset management process described above in connection with FIG. 6. This new chart, which may represent an optimization solution based at least in part on the customer's specified optimization parameters, may include an application column 804, a manufacturer column 806, an application version column 808, a licenses column 810, and a software asset license addition column 812.

As illustrated in the report chart of FIG. 8, the optimization solution presented within the report window 818 suggests that the Keydom Operating System V and the Megapeth VII Premium operating system, as well as the Hardmacro Workspaces '15 premium productivity suite, should be removed from any virtual machine instances in order to remove or replace any premium software assets from the customer's computing resources. This may include terminating any existing licenses for these software applications. Thus, the request processing sub-system may modify entries within the licenses column 810 and the software asset license addition column 812 corresponding to these applications to demonstrate that these applications should be terminated in order to achieve the optimized solution. Additionally, the request processing sub-system may highlight these software asset entries by utilizing a bold font face to draw the customer's attention to proposed changes made to these software assets. It should be noted that the request processing sub-system may utilize additional and/or alternative methods to illustrate the elimination of one or more applications within the report window 818. For instance, the request processing sub-system may utilize alternative font color schemes, increasing the presentation opacity of the affected entries, shading of the report chart cells corresponding to the affected entries, and the like.

Alternatively, if the request processing sub-system determines that licenses are required for a new software asset as part of the optimization solution, the request processing sub-system may generate a new entry for the software application and highlight this new software application entry. For instance, as illustrated in FIG. 8, the request processing sub-system may generate a new application entry (e.g., Megapeth VII Standard operating system, as illustrated in FIG. 8), the request processing sub-system may generate a new entry for this software application and highlight the entry to enable the customer to clearly note the introduction of this application. It should be noted that while bold font faces are utilized extensively throughout the present disclosure for the purpose of illustration, other highlighting methods may be utilized. For instance, the request processing sub-system may change the font color, report chart cell shading and color, font face, and the like for any modified or new entries.

Figure 9:
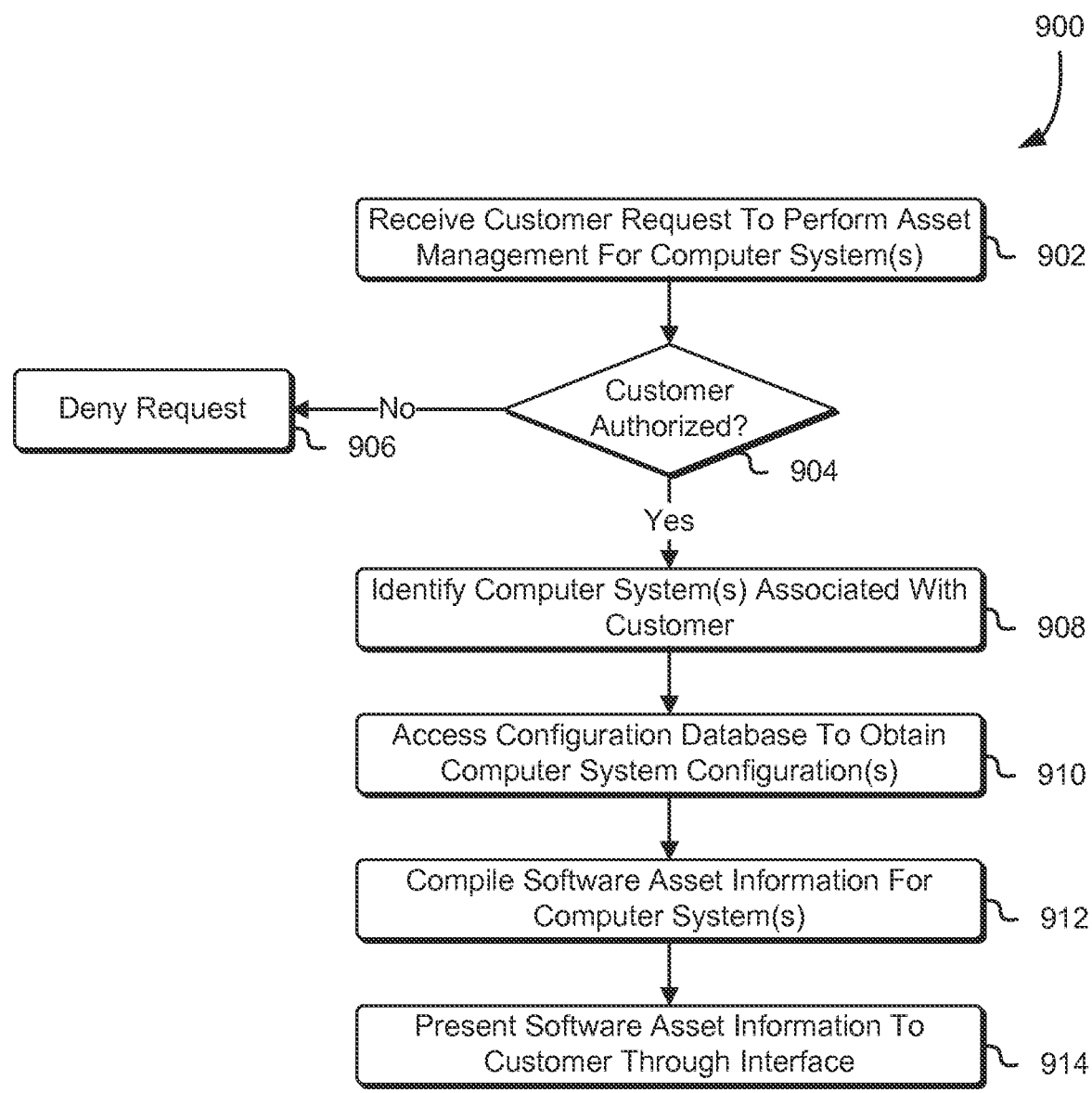
FIG. 9 shows an illustrative example of a process for presenting software assets to a customer in response to a customer request for performance of asset management for one or more computer systems in accordance with at least one embodiment.

As noted above, a software asset management service may provide customers with software asset configuration information for a variety of computer systems and resources. This software asset configuration information may be stored within a configuration database, which may be populated by physical host agents and virtual machine instance agents implemented by the virtual computer system service for each physical host and virtual machine instance, respectively. This information may be presented to the customer to enable the customer to perform software asset management as needed for its virtual machine instances. Accordingly, FIG. 9 shows an illustrative example of a process 900 for presenting software asset configuration information to a customer in response to a customer request for performance of asset management for one or more computer systems in accordance with at least one embodiment. The process 900 may be performed by the aforementioned software asset management service, which may be configured to access a configuration database to obtain any necessary information usable to fulfill customer requests for software asset management data.

At any time, the software asset management service may receive 902 a request from a customer (e.g., via a customer computer system, a client device, or through a command provided by the customer through another service) to perform software asset management for one or more computer systems and/or computing resources. The customer may generate the request through the virtual computer system service GUI, whereby a customer may select an option to initiate performance of software asset management for one or more computer systems selected through the virtual computer system service GUI. This may cause the computing resource service provider to transfer the customer to the software asset management service where the software asset management process is to be performed. Alternatively, the customer may access the software asset management service directly, whereby the customer may transmit the request and specify which computer systems are to be analyzed.

Upon receiving the request from the customer to perform software asset management for its computer systems, the software asset management service may determine 904 whether the customer is authorized to have software asset management performed for the selected instances. When the customer accesses the software asset management service, it may be required to provide credential information to the software asset management service GUI. The GUI may use this set of credentials to generate a digital signature of hash that may be used for authorization purposes. Alternatively, if the customer is required to provide this set of credentials when initiating the computing resource service provider interface, the software asset management service may obtain the digital signature of hash of this set of credentials from the computing resource service provider. The software asset management service may transmit this digital signature or hash to an identity management service. The identity management service may utilize this digital signature or hash to identify the customer and to identify any existing policies for the customer that may be applicable for software asset management and/or management of the selected computer systems. For instance, if a policy has been established that would deny the customer access to these computer systems, the identity management service may transmit a notification or an API call to the software asset management service indicating that the customer is not authorized to perform software asset management for the selected computer systems. This may cause the software asset management service to deny 906 the customer's request.

If the customer is authorized to enable the software asset management service to perform software asset management for one or more computer systems, the software asset management service may identify 908 the one or more computer systems associated with the customer. The software asset management service may identify the one or more computer systems based at least in part on the computer systems specified by the customer within the request. Alternatively, if the customer did not specify which computer systems are to be analyzed, the software asset management service may transmit a request to the identity management service to determine the one or more computer systems that may be associated with the customer and may be analyzed on its behalf.

Once the software asset management service has identified the one or more computer systems to be analyzed, the software asset management service may access 910 a configuration database to identify the software asset configuration for each of the one or more computer systems. As noted above, the configuration database may specify, for each computer system maintained by the virtual computer system service, the configuration information for the computer system. Each entry may be differentiated based at least in part on a unique instance identifier, physical host identifier, or unique name provided to the instance by the customer. Thus, the software asset management service may utilize any of the computer system identifiers to obtain the applicable entries. The software asset management service, once it has obtained all the required entries, may compile 912 the software asset information for the customer's one or more computer systems.

The software asset management service may utilize the compiled software asset information to generate one or more reports that may be displayed on the software asset management service GUI. Through these one or more reports, the software asset management service may present 914 the software asset information to the customer. This may enable the customer to evaluate the software assets used through its computer systems and determine whether to perform any optimization actions to improve these one or more computer systems. In some embodiments, the software asset management service will enable the customer to submit a request to the service to perform one or more optimization analyses based at least in part on the provided reports and any parameters the customer deems necessary for determining any optimization solutions.

Figure 10:
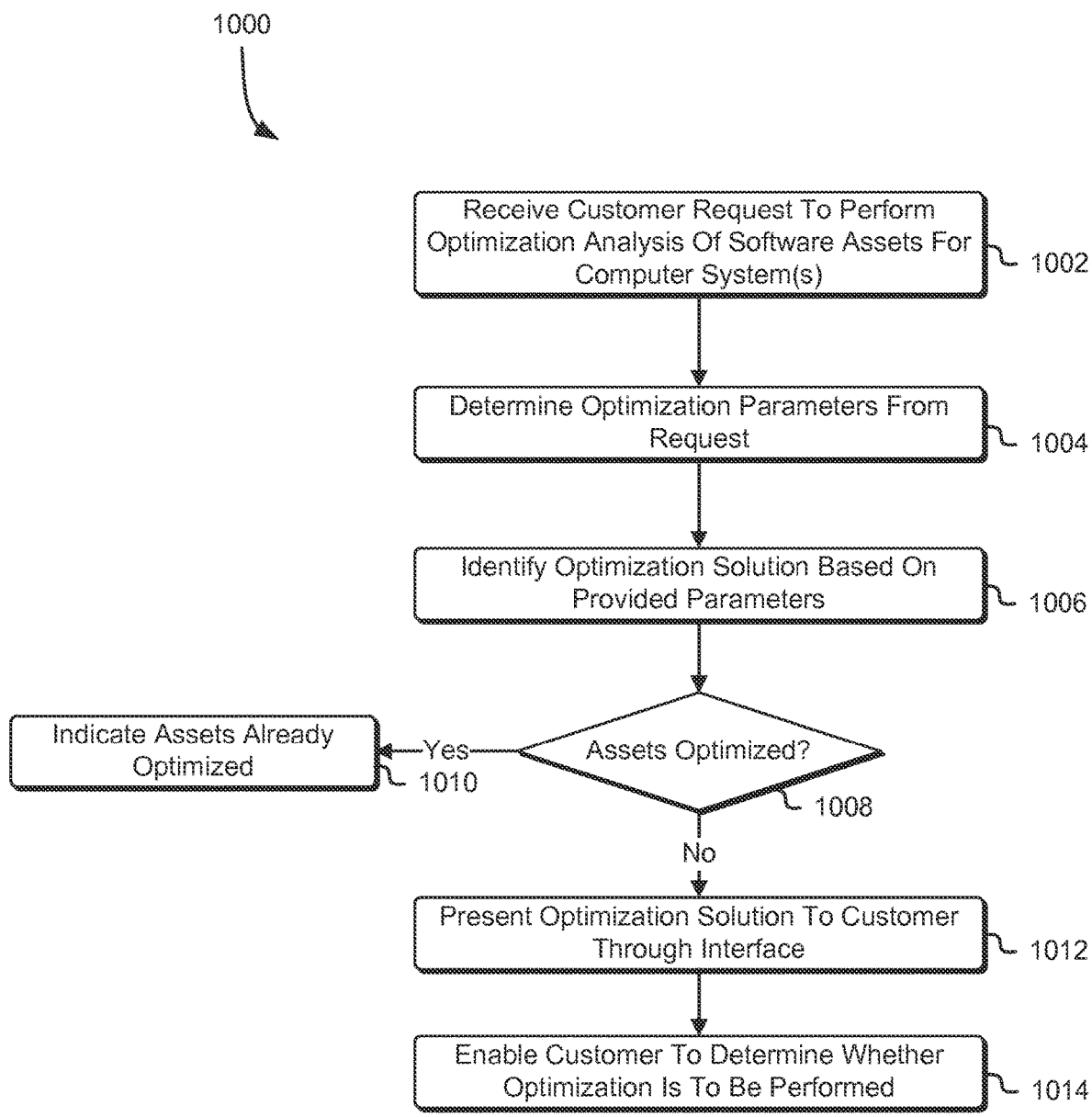
FIG. 10 shows an illustrative example of a process for presenting one or more optimization solutions for software assets in response to a customer request for optimization analysis of one or more computer systems in accordance with at least one embodiment.

A customer, upon obtaining the software asset management results from the software asset management, may request performance of one or more optimization analyses to determine whether there are available efficiencies that may be take advantage of through modification of the software configuration for its computer systems. Accordingly, FIG. 10 shows an illustrative example of a process 1000 for presenting one or more optimization solutions for software assets in response to a customer request for optimization analysis of one or more computer systems in accordance with at least one embodiment. The process 1000 may be performed by the software asset management service, which may be configured to identify any possible efficiencies and/or improvements that may be made to one or more computer systems based at least in part on a customer's specified optimization parameters and/or optimization algorithms programmed into a request processing sub-system of the software asset management service.

At any time, the software asset management service may receive 1002, from a customer (e.g., customer computing device, client device, etc.), a request to perform optimization analyses for one or more computer systems. The customer may transmit this request to the software asset management service through selection of an optimization analysis button within the software asset management service GUI, as illustrated in FIG. 6. Alternatively, a customer may request performance of optimization analyses without prior software asset management of its computer systems. For instance, when the customer accesses the software asset management service for the first time, it may specify that software asset management and optimization should be performed simultaneously or otherwise in a manner that the enables the customer to view the final optimization results without having to submit additional requests.

The customer, in submitting the request to the software asset management service, may specify one or more optimization parameters, which the software asset management service may use to perform the requested optimization analyses. Thus, the software asset management service may determine 1004 the optimization parameters specified by the customer from the received request. For instance, the customer may specify through a GUI provided by the software asset management service that the optimization solution should be based at least in part on the greatest reduction in CPU and memory usage. Alternatively, as illustrated in FIG. 7, a customer may specify through the GUI that the optimization solution should include a common productivity software supplier for all computer systems, and a single operating system across all computer systems. Other parameters may include, but are not limited to: reduction in storage capacity usage, shifts to less expensive physical hosts and hardware, and reduction in duplicative software application across computer systems. In some embodiments, the customer can also specify, through the request, pricing and other financial information that may be used to generate an optimization solution. For instance, the customer may specify, through the GUI provided by the software asset management service, license costs for each application, the cost of maintaining, the cost of computer system allocation, and the like. This may enable the software asset management service to further generate an optimization solution that reduces the cost to the customer to maintain the one or more computer systems being analyzed.

Once the software asset management service has determined the optimization parameters to be used for the optimization analysis, the software asset management service may identify 1006 an optimization solution based at least in part on these parameters. The software asset management service may evaluate the customer's computer systems and the software configuration for each of these instances to identify any potential changes that may be performed. Subsequently, the software asset management service may perform one or more operations, utilizing various change iterations to achieve an optimal solution that satisfies the constraints enforced as a result of the defined optimization parameters and provides the greatest potential improvement over the status quo. For instance, this optimization solution may represent the greatest cost savings while reducing the CPU and memory usage for each of the customer's computer system. It should be noted that the optimization solution identified may not necessarily be the optimal solution for the customer's computer systems but may instead represent a possible solution that satisfies the customer's specified parameters and criteria for generating an optimization solution.

The software asset management service, upon identifying the optimization solution for the customer's computer systems, may determine 1008 whether the customer's software assets are already optimized according to the calculated solution. If the customer's software assets are already optimized, the software asset management service may indicate 1010, through the software asset management service GUI, that the customer's software assets are already optimized and no changes are necessary. However, if the software assets have not been optimized, the software asset management service may present 1012 the optimization solution to the customer through the GUI. For instance, as illustrated in FIG. 7, the software asset management service may detail any changes that may be made to the software configuration of the customer's computer systems to achieve the optimized solution. Further, the software asset management service may notify the customer of the potential improvements that may be achieved through optimization (e.g., cost savings, decrease in resource usage, etc.).

Once the optimization solution has been presented to the customer, the software asset management service may enable 1014 the customer to determine whether optimization may be performed for the analyzed computer systems. The software asset management service may present the customer with an option to optimize the computer systems according to the presented solution. If the customer opts to perform optimization of these instances, the software asset management service may transmit one or more requests to a virtual computer system service to perform the operations necessary to achieve the optimized solution. The software asset management service may further provide the customer with an option to generate new optimization solutions based at least in part on revised or alternative optimization parameters.

Figure 11:
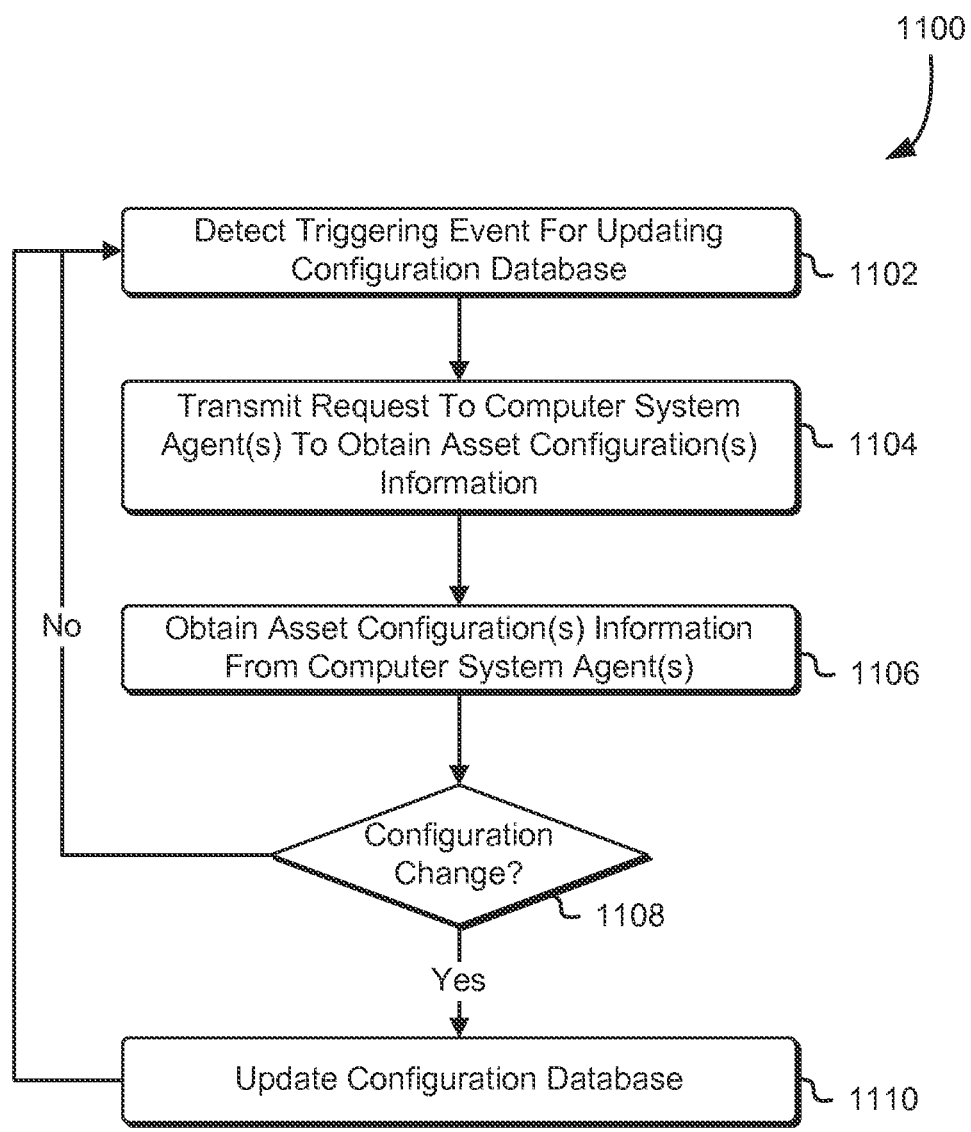
FIG. 11 shows an illustrative example of a process for compiling computer system asset configurations for one or more computer systems in accordance with at least one embodiment.

As noted above, the software asset management service may include a configuration database, which may include entries for each computer system maintained by the virtual computer system service, as well as the software configuration for each of these computer systems. In order to maintain the veracity of this database, each virtual machine instance and physical host may include an agent, which may be configured to obtain configuration information for each virtual machine instance and physical host, respectively, and to provide this information to the configuration database. Accordingly, FIG. 11 shows an illustrative example of a process 1100 for compiling computer system asset configurations for one or more computer systems in accordance with at least one embodiment. The process 1100 may be performed by the software asset management service, which may be configured to interact with the physical host agent of each physical host and the virtual machine instance agent of each virtual machine instance maintained by the virtual computer system service in order to obtain the configuration information necessary to update the configuration database.

The software asset management service may, at any time, detect 1102 a triggering event for updating the configuration database. For instance, the software asset management service may be configured to update the configuration database after a particular period of time has passed (e.g., every hour, every day, every week, etc.). Alternatively, the software asset management service may be configured to update the configuration database upon detection of a request from a customer to perform software asset management for one or more virtual machine instances. In some embodiments, the process 1100 may be performed without this particular operation, as the physical host agents and the virtual machine instance agents themselves may be configured to transmit configuration information to the service upon detection of a triggering event, such as detection of a change in the software configuration of a virtual machine instance.

Upon detection of the triggering event, the software asset management service may transmit 1104 a request to the one or more computer system agents to obtain the software asset configuration information from these computer system agents. In response to this request, the computer system agents may, in turn, evaluate the corresponding computer system to identify the software asset configuration for the computer system. As noted above, each computer system may include an agent configured to monitor the computer system, as well as compile the software asset configuration information for the computer system. Thus, the computer system agent may obtain the configuration information for the particular computer system.

The computer system agents of the virtual computer system service, upon obtaining the configuration information from the associated computer systems, may transmit the collected configuration information to the software asset management service. Thus, the software asset management service may obtain 1106 the configuration information for each computer system maintained by the virtual computer system service. This may enable the service to determine 1108 whether there has been a change to the configuration of any of the computer systems. If no changes are detected, the software asset management service may await the next triggering event in order to identify any future changes that may arise. If the software asset management service identifies any software configuration changes for the computer systems, the software asset management service may update 1110 the configuration database to incorporate this updated information.

Figure 12:
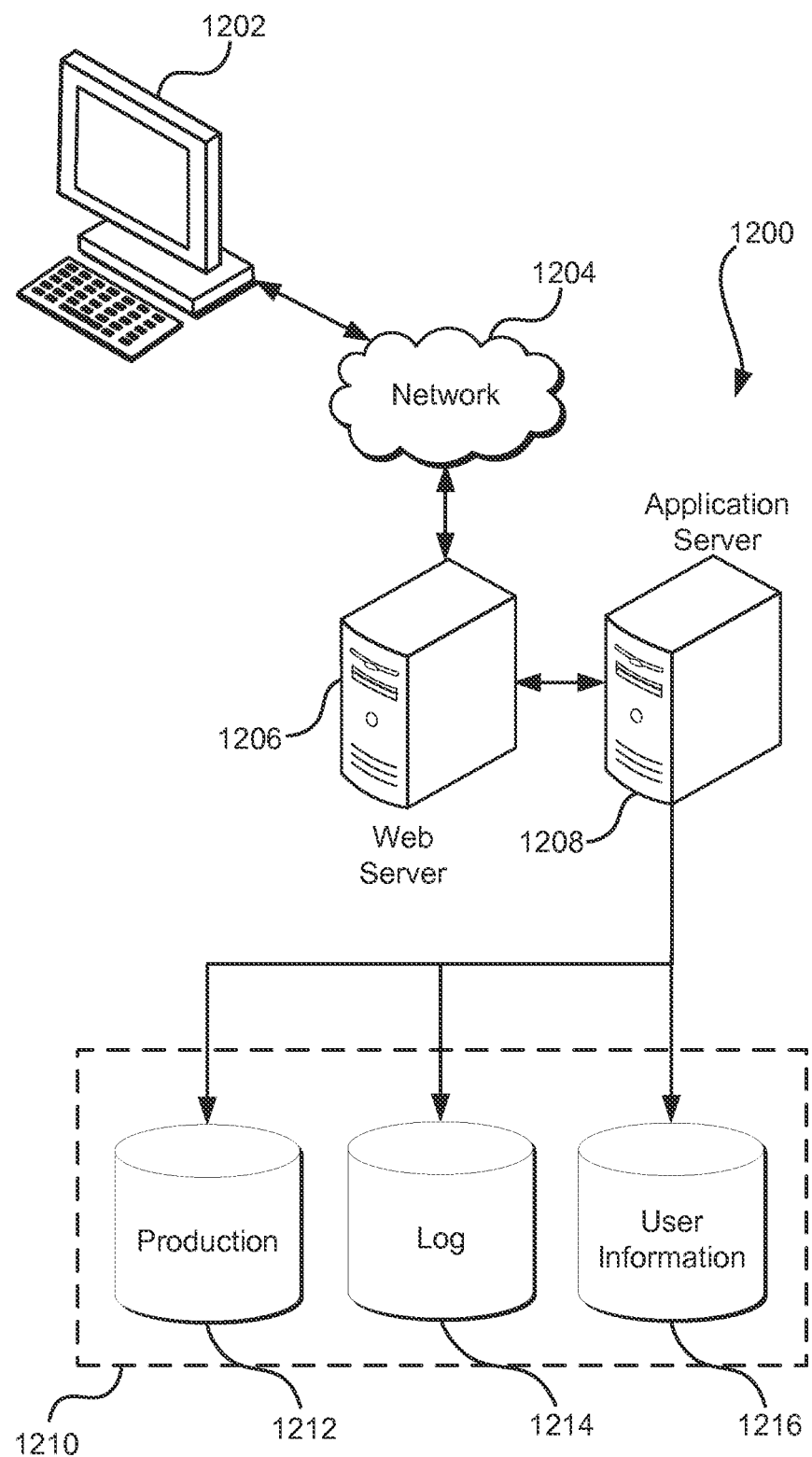
FIG. 12 shows an illustrative example of an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, via a communication network, from one or more virtual machine instances instantiated by a virtual computing system service comprising one or more computing devices, software asset information of computer systems associated with a plurality of customers, the software asset information including an updated listing of active software programs running, and inactive software programs configured to be run, on the computer systems associated with licenses of the plurality of customers;
    updating a configuration database with the software asset information of the computer systems in the communication network, the configuration database organized into entries based at least in part on unique identifiers for the computer systems;
    receiving, from a customer computer system, a request to obtain a report of software assets of computer systems;
    fulfilling the request, based at least in part on credential information associated with the customer computer system, by accessing the configuration database to obtain software asset information of the computer systems including the report of active software programs running, and inactive software programs configured to be run, the reported active and inactive software programs indicating an amount of licenses purchased and an amount of licenses that are being used for individual software assets;
    performing an optimization analysis, based at least in part on one or more optimization parameters specifying financial costs for the software assets, on the obtained software asset information; and
    updating a graphical user interface to present an updated report comprising the obtained software asset information and at least one optimization solution to the customer computer system as a result of performing the optimization analysis, wherein the updated report indicates that the at least one optimization solution for the software assets specifies potential cost savings and computing resource usage savings achievable by optimizing the software assets, the potential cost savings calculated based at least in part on the financial costs for the software assets.

2. The computer-implemented method of claim 1, wherein a subset of the computer systems associated with the customer computer system are maintained within the customer computer system's on-premises network.

3. The computer-implemented method of claim 1, further comprising:
    receiving, from the customer computer system, a second request to perform the optimization analysis, the second request specifying one or more optimization parameters usable for determination of the at least one optimization solution; and
    determining, based at least in part on the received one or more optimization parameters and the software asset configuration information for the computer systems associated with the customer computer system, the at least one optimization solution.

4. The computer-implemented method of claim 3, wherein the optimization solution is based at least in part on software asset information from computer systems of at least one other customer computer system.

5. A system, comprising:
    memory to store instructions that, as a result of being executed by one or more processors of the system, cause the system to at least:

obtain, via a communication network, software asset information of a plurality of computer systems used to provide a hosted computer service to multiple customers of a service provider, the software asset information being stored in one or more memory storage associated with the plurality of computer systems and indicating inactive software programs configured to be utilized, and active software programs being utilized, within computing resources maintained and operated by the service provider comprising one or more computing devices;

update, based at least in part on software asset information of the plurality of computer systems in the communication network, a database to specify the software asset information;

receive a request, from a customer computing device associated with a customer of the service provider, to obtain a report of software assets of one or more computing systems in the communication network associated with the customer;

access the database to obtain software asset information of the one or more computing systems in the communication network associated with the customer including active software programs running, and inactive software programs configured to be run, on the one or more computing systems in the communication network associated with the customer, the reported active and inactive software programs indicating an amount of licenses purchased and an amount of licenses that are being used for individual software assets;

apply an optimization analysis, based at least in part on one or more optimization parameters specifying financial costs for the software assets, to optimize the software assets; and update an interface to present the report comprising the compiled software asset information and at least one optimization solution to the customer computing system as a result of performing the optimization analysis, wherein the updated report indicates that the at least one optimization solution for the software assets specifies potential cost savings and computing resource usage savings achievable by optimizing the software assets, the potential cost savings calculated based at least in part on the financial costs for the software assets.

6. The system of claim 5, wherein the instructions that, as a result of being executed by the one or more processors of the system, further cause the system to:
authenticate an identity of the customer to determine whether fulfillment of the request is authorized; and
determine, based at least in part on whether fulfillment of the request is authorized, whether to generate the report.

7. The system of claim 5, wherein the instructions that, as a result of being executed by the one or more processors of the system, further cause the system to compile the obtained software asset information to generate the report based at least in part on software asset names, software asset manufacturers, software asset category, software asset licenses purchased, and software asset licenses in use.

8. The system of claim 5, wherein the plurality of computer systems individually each execute a computer system agent configured to obtain the software asset information.

9. The system of claim 5, wherein a subset of the one or more computing systems associated with the customer are maintained within the customer's on-premises network.

10. The system of claim 5, wherein the instructions that, as a result of being executed by the one or more processors of the system, further cause the system to transmit a request to the plurality of computer systems to obtain the software asset information.

11. The system of claim 5, wherein the instructions that, as a result of being executed by the one or more processors of the system, further cause the system to:
receive, from the customer computing device, a second request to perform the optimization analysis, the second request specifying one or more optimization parameters; and
generate, based at least in part on the one or more optimization parameters and the obtained software asset information, the optimization solution.

12. The system of claim 11, wherein:
the one or more optimization parameters specify a financial cost for software assets of the software asset information; and
the optimization solution specifies potential cost savings and potential computing resource usage savings achievable by optimizing the software assets, the potential cost savings calculated based at least in part on the specified financial cost for the software assets.

13. A non-transitory computer-readable storage medium having stored thereon executable instructions that, as a result of being executed by one or more processors of a computer system, cause the computer system to at least:
update, based at least in part on software asset information of a plurality of computer systems in a communication network used to provide a hosted computer service to a plurality of customers of a service provider, a database to specify the software asset information, the software asset information obtained from the plurality of computer systems and identifying one or more inactive software programs configured to be utilized, and active software programs being utilized, within computing resources of the service provider;
receive a request to obtain a report of software assets of a set of computer systems in the communication network associated with a customer;
obtain, from the database, software asset information of the set of computer systems in the communication network including active software programs running, and inactive software programs configured to be run, on the set of computer systems associated with the customer, the reported active and inactive software programs being licensed to the customer indicating an amount of licenses purchased and an amount of licenses that are being used for individual software assets; and
provide the report, as a result of performing an optimization analysis using optimization parameters specifying financial costs for the software assets, to a customer computing device associated with the customer, wherein the report indicates that at least one optimization solution for the software assets specifies potential cost savings and computing resource usage savings achievable by optimizing the software assets, the potential cost savings calculated based at least in part on the financial costs for the software assets.

14. The non-transitory computer-readable storage medium of claim 13, wherein the plurality of computer systems each execute a computer system agent configured to obtain the software asset information.

15. The non-transitory computer-readable storage medium of claim 13, wherein the plurality of computer systems include virtual machine instances and physical hosts maintained by the hosted computer service.

16. The non-transitory computer-readable storage medium of claim 13, wherein the instructions further cause the computer system to:
- receive a second request to perform the optimization analysis, the second request specifying one or more optimization parameters; and
- generate, based at least in part on the one or more optimization parameters and the obtained software asset information, the optimization solution.

17. The non-transitory computer-readable storage medium of claim 16, wherein:
- the one or more optimization parameters specify preferred versions to be used for software assets of the software asset information; and
- the optimization solution specifies potential savings achievable by optimizing the software assets to utilize the preferred versions of the software assets, the potential savings calculated based at least in part on pricing data and computing resource benchmark data for the software assets.

18. The non-transitory computer-readable storage medium of claim 13, wherein the instructions further cause the computer system to transmit a request to the plurality of computer systems to obtain the software asset information, the request generated as a result of a programmed period of time having passed.

19. The non-transitory computer-readable storage medium of claim 13, wherein the instructions further cause the computer system to compile the obtained software asset information to generate the report.

20. The non-transitory computer-readable storage medium of claim 13, wherein the instructions further cause the computer system to:
- authenticate an identity of the customer to determine whether fulfillment of the request is authorized; and
- determine, based at least in part on whether fulfillment of the request is authorized, whether to generate the report.

\* \* \* \* \*